(12) United States Patent
Collins et al.

(10) Patent No.: US 10,161,271 B2
(45) Date of Patent: Dec. 25, 2018

(54) AIR COMPRESSOR HAVING SUPPLEMENTAL POWER SOURCE

(71) Applicant: Ingersoll-Rand Company, Davidson, NC (US)

(72) Inventors: James Christopher Collins, Mooresville, NC (US); Marion Patrick McDonald, Jr., Statesville, NC (US)

(73) Assignee: Ingersoll-Rand Company, Davidson, NC (US)

( * ) Notice: Subject to any disclaimer, the term of this patent is extended or adjusted under 35 U.S.C. 154(b) by 120 days.

(21) Appl. No.: 15/006,638

(22) Filed: Jan. 26, 2016

(65) Prior Publication Data

US 2017/0211428 A1   Jul. 27, 2017

(51) Int. Cl.
| | |
|---|---|
| *F01K 23/12* | (2006.01) |
| *F04B 35/01* | (2006.01) |
| *F04C 18/34* | (2006.01) |
| *F28D 15/02* | (2006.01) |
| *F01K 7/16* | (2006.01) |
| *F04C 18/02* | (2006.01) |
| *F04C 18/16* | (2006.01) |
| *F04B 35/06* | (2006.01) |

(Continued)

(52) U.S. Cl.
CPC .............. *F01K 23/12* (2013.01); *F01K 7/16* (2013.01); *F04B 35/002* (2013.01); *F04B 35/006* (2013.01); *F04B 35/01* (2013.01); *F04B 35/04* (2013.01); *F04B 35/06* (2013.01); *F04C 18/0215* (2013.01); *F04C 18/16* (2013.01); *F04C 18/34* (2013.01); *F28D 15/02* (2013.01); *F16H 3/54* (2013.01); *F28D 2015/0291* (2013.01)

(58) Field of Classification Search
CPC .......... F01K 23/12; F01K 7/16; F04B 35/002; F04B 35/04; F04B 35/006; F04B 35/06; F04C 18/16; F04C 18/34; F04C 18/0215; F28D 15/02; F28D 2015/0291; F16H 3/54
USPC ................ 417/16, 17, 364, 375, 380, 410.1; 60/605.1, 614, 616, 618
See application file for complete search history.

(56) References Cited

U.S. PATENT DOCUMENTS 4,900,231 A * 2/1990 Kennedy ................ B64D 41/00
                                                         417/16
5,163,294 A * 11/1992 Shirai .................... F02B 37/007
                                                         60/602

(Continued)

OTHER PUBLICATIONS

Gambini, M. et al., "Metal Hydride Storage Systems: State of the Art Analysis and Integration in FC-Based Energy Systems," Dept. of Business Engineering, University of Rome Tor Vergata (2007), 11 pp.

(Continued)

*Primary Examiner* — Hoang Nguyen
(74) *Attorney, Agent, or Firm* — Taft Stettinius & Hollister LLP (57) ABSTRACT

A fluid expander is disclosed as used in conjunction with an air compressor that is driven by a prime mover. The fluid expander is structured to extract useful work from a fluid stream and add that work to the work provided by the prime mover to the compressor. In some embodiments a clutch can be used to decouple the expander from the compressor if insufficient work is developed by the expander. A gear train can also be used to change the rotational speed prior to work being delivered to the compressor.

22 Claims, 4 Drawing Sheets

(51) Int. Cl.
    *F04B 35/04*     (2006.01)
    *F04B 35/00*     (2006.01)
    *F16H 3/54*     (2006.01)

(56) References Cited

U.S. PATENT DOCUMENTS

| | | | |
|---|---|---|---|
| 6,481,205 B2 * | 11/2002 | Fledersbacher | F01D 15/10 60/605.1 |
| 6,986,645 B2 * | 1/2006 | Iwanami | B60H 1/3208 417/16 |
| 7,454,910 B2 * | 11/2008 | Hamada | F01K 23/065 60/618 |
| 2010/0158702 A1 * | 6/2010 | Colavincenzo | F04B 35/002 417/16 |
| 2012/0011871 A1 * | 1/2012 | Czechowski | F25B 27/02 62/238.3 |
| 2013/0152581 A1 * | 6/2013 | Lofgren | F02B 37/105 60/605.1 |
| 2015/0047351 A1 * | 2/2015 | Ishikawa | F02G 5/04 60/615 |

OTHER PUBLICATIONS

Brown, K. et al., "Electrical Storage Using Hydrogen and Metal Hydride Slurry for Baseload or Dispatchable Power," Safe Hydrogen, LLC, Nov. 26, 2013, 23 pp.

* cited by examiner

AIR COMPRESSOR HAVING SUPPLEMENTAL POWER SOURCE

TECHNICAL FIELD

The present invention generally relates to compressors/fluid pumps having supplemental power sources, and more particularly, but not exclusively, to air compressors having clutched supplemental power source.

BACKGROUND

Providing air compressors/fluid pumps with power sources supplemental to a prime mover that drives the air compressor remains an area of interest. Some existing systems have various shortcomings relative to certain applications. Accordingly, there remains a need for further contributions in this area of technology.

SUMMARY

One embodiment of the present invention is a unique air compressor having a supplemental power source. Other embodiments include apparatuses, systems, devices, hardware, methods, and combinations for clutched engagement of a supplemental power source for use with an air compressor. Further embodiments, forms, features, aspects, benefits, and advantages of the present application shall become apparent from the description and figures provided herewith.

DETAILED DESCRIPTION OF THE ILLUSTRATIVE EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Figure 1:
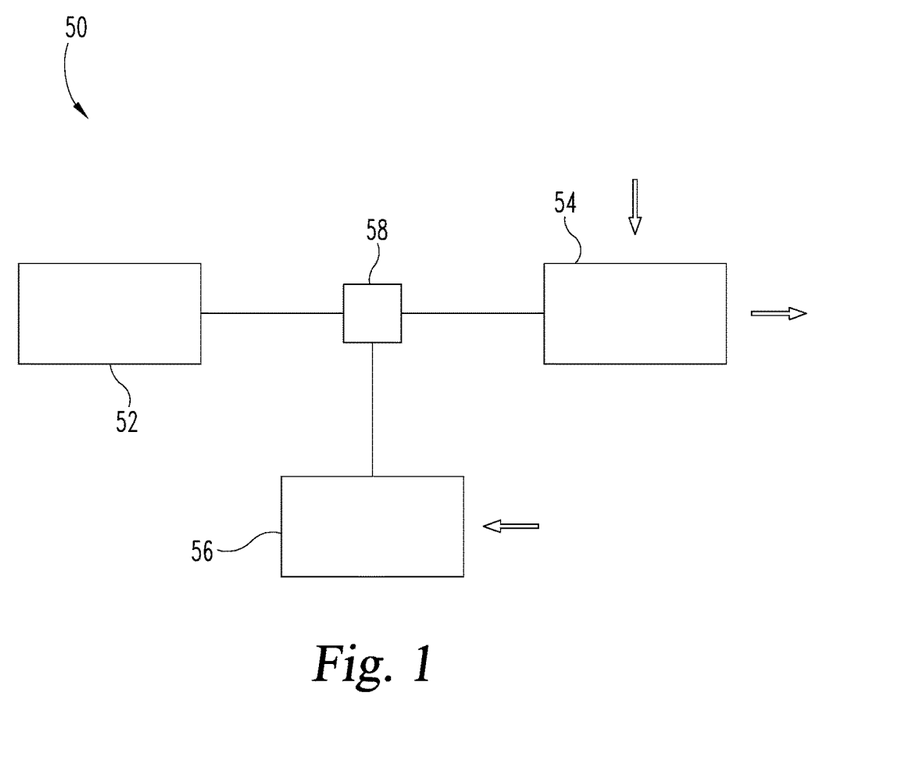
FIG. 1 depicts an embodiment of a compression system having a prime mover, compressor, and expander.

With reference to FIG. 1, a compression system 50 is shown in which mechanical power provided by a prime mover 52 to drive a compressor 54 can be supplemented with mechanical power provided by an expander 56 through a coupler 58. The compressor 54 can be any type of device that produces a rise in pressure (static, dynamic, and/or total) of a fluid. These devices can take on any form, such as but not limited to an air compressor, refrigerant compressor, air blower, etc. The prime mover 52 can be any type of device which supplies motive power to the compressor 54, and can take any variety of forms such as an electric motor, an internal combustion engine, etc.

The expander 56 includes a mechanical device structured to convert fluidic energy such as pressure and/or momentum into mechanical shaft power output through interaction of a flowing fluid stream with a mechanically responsive member. To accomplish the conversion from fluid flow energy to mechanical shaft power, the expander 56 can take on any variety of forms such as, but not limited to a turbine including (e.g. reactive turbine, impulse turbine), a rotary screw expander, a scroll expander, a sliding vane expander, or similar device, among others. It will be appreciated that a turbine can include any number of bladed features which interact with the moving fluid stream. The expander 56 can be used on any number of different types of compressible fluids, but in some embodiments can also be used with incompressible fluids.

The expander 56 can be driven by any suitable fluid stream provided from any suitable source. To set forth just a few non-limiting examples, the fluid stream can be comprised of a fluid that is compressible or alternatively non-compressible. In some forms the fluid stream can be created from operation of a Rankine cycle system (such as a steam cycle) or Organic Rankine cycle system either of which are, in some embodiments, structured to function as waste heat recovery systems useful to convert waste heat from a process into useful work. Such a waste heat recovery system can be used to recover heat generated during operation of the compressor 54, but can alternatively be used to recover waste heat from other systems unrelated to operation of the compressor 54. In still other forms the expander 56 can configured to receive a fluid stream from systems that supply high pressure and/or high velocity air, such as air motors and air starters.

It will be appreciated that any of the cycles mentioned above (Rankine, Organic Rankine, steam, etc) can be formed such as to be closed circuits. For example, a fluid that flows within a steam cycle system can be entirely enclosed within that system as it circulates from a reference location through the various components and returning to the same reference location.

The coupler 58 integrates mechanical work from both the prime mover 54 and expander 56 and can be achieved in many ways so that both can contribute to operation of the compressor 52. Such an integration of mechanical work from the prime mover 54 and expander 56 can be thought of as a device that mechanically adds, or sums, power together from these sources. Any number of shafts, gearing, etc can be used to mechanically connect either or both of the prime mover 54 and expander 56 to the coupler 58. Likewise, any number of shafts, gearing, etc can be used to mechanically connect the coupler 58 to the compressor 54. To set forth just a few non-limiting examples, the coupler 58 can include attachment to a double shafted motor to supplement input torque to the prime mover 52; or it can be a direct attachment to the drive or driven gear between the prime mover 52 and compressor 54; or directly to an opposing shaft (i.e. doubled shafted) of the compressor 54; or to drive an alternate component within the compressor 54 such as a cooling fan, oil pump, or other rotating component independent of the prime mover 52.

A mechanical gear train can alternatively and/or additionally be used with or within the coupler 58 to reduce and/or increase the speed of any of the prime mover 52, expander 56, and compressor 54 when used with the coupler 58. Furthermore, to account for situations in which the expander 56 may not provide sufficient rotation/torque to the compressor 54 relative to the prime mover 52, a clutch can be provided to permit the expander 56 to rotate freely so that the prime mover 52 is not required to also drive it along with the compressor 54. Such a clutch can take on any form, for example a freewheel or overrunning clutch, a sprag clutch or roller, a ratcheting device, Bendix drive, or any other suitable type that would permit effective disengagement of the expander 56 from the compressor 52 if insufficient power/ torque/speed is provided by the expander 56 relative to the prime mover 52.

Figure 2:
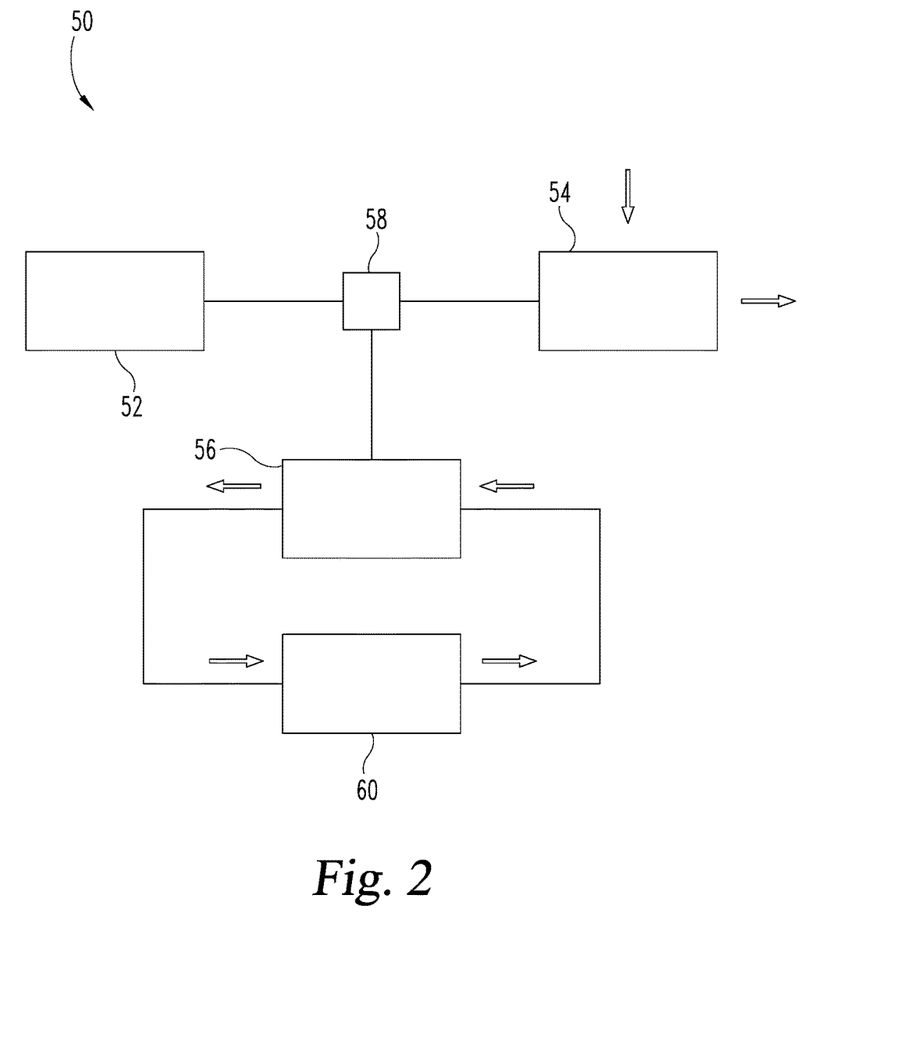
FIG. 2 depicts another embodiment of a compression system having a prime mover, compressor, and expander.

Turning now to FIG. 2, another embodiment of the compression system 50 is shown in which the expander 56 is coupled with a closed system (e.g. Organic Rankine cycle, to set forth just one of the nonlimiting embodiments) in which a heater 60 or other suitable heat transfer component is used to heat a fluid in the closed system. The heated fluid is then routed to the expander 56 for the conversion of fluidic energy into mechanical shaft power. The depiction in FIG. 2 is merely an example of any suitable system capable of adding heat to a system and converting that heat to mechanical work output via the expander 56. Other devices can be added to the system shown in FIG. 2, such as but not limited to a fluid pump. The heater 60 can be a device which is separate from the compression system 50, and in some applications is an entirely separate system. In other alternative and/or additional embodiments the heater 60 can be one or more components of the compression system 50 which produces heat (e.g. waste heat) sufficient to raise the temperature of the fluid.

Figure 3:
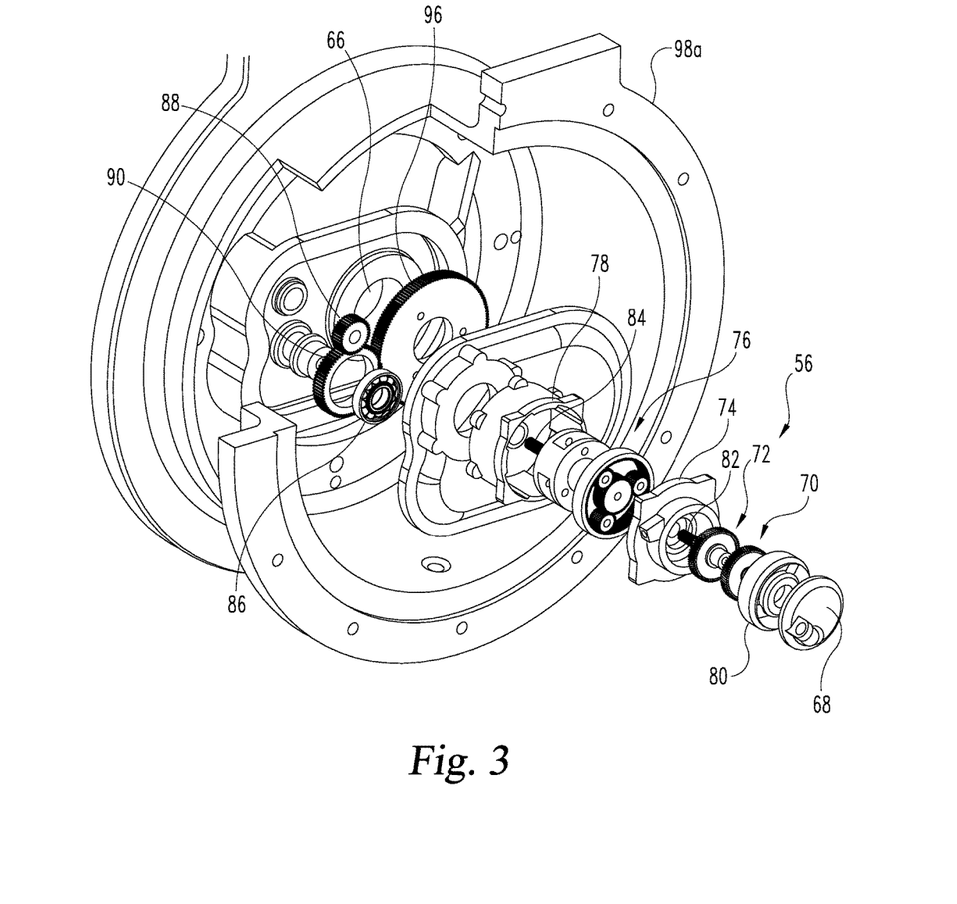
FIG. 3 depicts an embodiment of an expander for use with a compressor.
Figure 4:
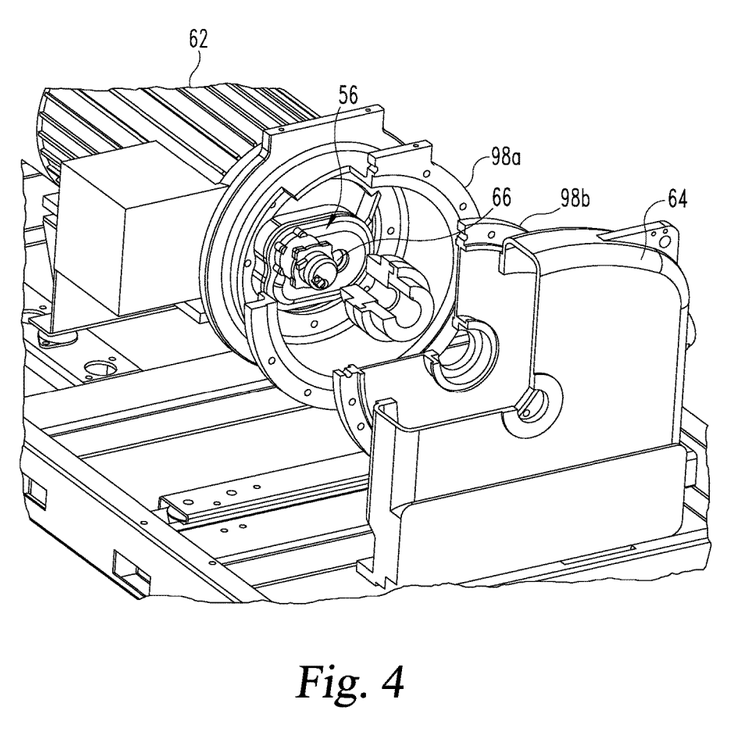
FIG. 4 depicts an embodiment of an expander for use with a compressor.

Turning now to FIGS. 3 and 4, one embodiment is depicted of the expander 56 used to convert fluidic energy into mechanical shaft power which is eventually provided to the compressor 54 via the coupler 58. The embodiment depicted in FIGS. 2 and 3 includes a prime mover in the form of an electric motor 62 which is structured to provide motive power to the compressor 54 via a shaft that would project through passage 66. Note that in FIG. 4 only the compressor housing 64 is shown for simplicity, and that also for simplicity the shaft that projects through passage 66 is also not shown.

The embodiment of the expander 56 shown in exploded view in FIG. 3 includes a flow inlet cover 68, stator nozzles 70, turbine wheel 72, turbine wheel housing 74, and speed changing transmission 76. The flow inlet cover 68 can include an opening to which a hose or conduit is attached via a coupler so that fluid can flow into the expander 56. The flow inlet cover can be attached to the turbine wheel housing 74, which is itself can be connected to the speed changing transmission 76 and/or to a separate housing 78. In some forms the turbine wheel housing 74 is connected directly to the separate housing 78 while the flow inlet cover is attached to the turbine wheel housing 74. As will be appreciated, various alternative arrangements beyond those described herein above or below are contemplated for the interconnection of the components associated with the expander 56.

As fluid flow enters the expander 56 it encounters a flow director 80 which can be used to condition and/or collect flow prior to its introduction to the mechanical expander elements within the expander 56. After entry into the expander 56 fluid flow encounters the stator nozzles 70 which are structured to direct the flow toward the blades of the rotatable turbine wheel 72. Sufficient pressure and velocity provided through the stator nozzles assist in rotating a shaft 82 which is connected to a gear of the speed changing transmission 76.

In one embodiment the speed changing transmission 76 can be in the form of a speed reducing transmission. In such a form the initial high speed/low torque associated with the shaft 82 can be converted to relatively low speed/high torque via gearing connected with the speed changing transmission. The relatively low speed/high torque produced through the gearing can then be delivered to a shaft that provides power (either directly or indirectly) to the compressor 54.

The speed changing transmission 76 is depicted as including a planetary gear configuration in one portion of the power train, but not all embodiments of the speed changing transmission 76 need to be configured in the same manner. Furthermore, not all speed change gearing associated with speed changing transmission 76 need be located in one confined location. Other gearing can be located elsewhere than the planetary gearing depicted in the illustrated embodiment of FIG. 3. In any event, the shaft 82 in the illustrated embodiment is connected with a sun gear in FIG. 3, and through the planet gears is connected to an outer ring gear. Power from the shaft 82 is eventually transmitted to an output shaft 84.

In the illustrated embodiment, a clutch 86 is disposed between the planetary gearing of the speed changing transmission 76 and a pinion 88. The clutch 86 can take on many forms such as an overrun clutch, and can operate as described above in that the clutch can engage to decouple the expander 56 from the power train that drives the compressor 54 if insufficient power is developed through the expander 56. The clutch can be structured in various embodiments to permit the prime mover (depicted as an electric motor 62 in FIGS. 2 and 3) to drive the compressor 52 regardless of whether the expander 56 provides sufficient work or not. In some cases the flow rate and pressure of fluid will be insufficient for the expander 56 to contribute work to the compressor 52.

The pinion 88 is connected to a drive gear 90 which is mounted to an idler shaft 92 via bearing 94. The bearing 94 can take on any variety of forms including a rolling element bearing such as, but not limited to, a ball bearing having an inner and outer race. The drive gear 90 is coupled with driven gear 96 which rotates with the shaft connected between the compressor and prime mover.

In the illustrated embodiment the expander 56 is depicted as coupled in power communication with a compressor shaft at the location of the drive gear 90 and driven gear 96 when the expander 56 produces sufficient power. In other embodiments, however, the expander 56 can be coupled in power communication at other locations. For example, the expander 56 can be coupled at the compressor shaft closer to the compressor 54, or can be positioned closer to the prime mover 54. In still other forms, the expander 56 can be coupled in power communication directly to the compressor 54.

The components listed above related to the expander 56 and/or related to the power train between the expander 56 and shaft that drives the compressor 54 can be located within an adapter having adapter housing components 98a and 98b. In other embodiments, one or more of the components described above can be located external to the adapter, either affixed to or separate from the adapter. The adapter itself can be located between the prime mover 52 and the compressor 54. In some embodiments the adapter housing can act as a chassis upon, or in which, are affixed/located any number of components associated with the expander 56 and coupler 58. The housing can be completely enclosed, and in some forms can be partially enclosed.

Though the illustrated embodiment depicts two separate components 98a and 98b forming an adapter housing, other embodiments can include fewer or additional components to form such a housing. The components 98a and 98b form an internal space that can accommodate a variety of gearing, shafts, and other coupling devices. For example, the internal space can include components such as some or all of those shown in FIGS. 3 and 4 associated with the expander 56 and coupler 58.

The adapter housing can be used with a number of different electric motors and/or a number of different compressors. In some forms the housing can be used along with a common motor that together can be coupled to a variety of different compressors. For example, the adapter can include a bolt hole pattern, or similar fixture pattern, on either or both ends that is a common pattern useful between various different compressors and/or motors. The gearing and any associated shafting located internal to the adapter can be changed depending on the type of motor used and/or type of compressor in any given application. Such gearing and any associated shafting can be changed inside the adapter to provide torque and speeds suitable to the requirements of any given compressor. For example, a compression system can be modified to replace its compressor with another compressor having different flow rate and pressure specifications. The replacement compressor may be required to turn at different speeds.

One aspect of the present application provides an apparatus comprising a prime mover having an rotatable output structured to provide a rotative mechanical power output, a fluid pump in power communication with the prime mover through the rotative mechanical power output and having an inlet for the receipt of a fluid and an outlet for the conveyance of a fluid, a waste heat system power provider structured to receive and extract work from a waste heat system working fluid, the waste heat system working fluid being a different composition from the fluid received in the fluid pump, and an adapter having an adapter housing located between the prime mover and the fluid pump, the adapter having a mechanical summer structured to add the work extracted by the waste heat system power provider to the rotative mechanical power output provided by the prime mover such that total work required to drive the fluid pump is provided by both the prime mover and the waste heat system power provider.

A feature of the present application provides wherein the fluid pump is a compressor and the fluid is air.

Another feature of the present application further includes a clutch mechanically coupled to the waste heat system power provider, the clutch structured to selectively mechanically connect the waste heat system power provider to the fluid pump.

Still another feature of the present application provides wherein the waste heat system power provider is a turbine structured to provide power to the fluid pump, and wherein the waste heat system working fluid and the working fluid are separate fluids.

Yet still another feature of the present application provides wherein the turbine is located within the adapter housing, wherein the waste heat system fluid is in a closed circuit.

Still yet another feature of the present application provides wherein the separate fluids are different compositions, and wherein the clutch is an overrun clutch.

A further feature of the present application provides wherein the waste heat system fluid circulates in a closed circuit which includes components structured to change the phase of the waste heat system fluid from liquid to gas, and wherein the clutch includes components that permits the waste heat system power provider to be decoupled from the fluid pump if insufficient work is produced.

A still further feature of the present application provides wherein the clutch is located within the adapter housing.

Another aspect of the present application provides an apparatus comprising: a compressor having structural members arranged to provide compression of a compressible gas, an electric motor having an output shaft mechanically connected to and in working communication with the compressor, the electric motor structured to provide work to the output shaft useful to the compressor for the compression of the compressible gas, a fluid expander structured to extract mechanical work from a working fluid which is received by the fluid expander at a first pressure and subsequently discharged from the fluid expander at a second pressure as a result of extracting work from the working fluid, and a mechanical power coupler having a clutch structured to selectively add work from the fluid expander to work provided through the output shaft of the electric motor such that total power delivered to the compressor originates from both the electric motor and the fluid expander when the clutch selectively adds work from the fluid expander.

A feature of the present application provides wherein the fluid expander is one of a turbine, rotary screw expander, a scroll expander, and a sliding vane expander.

Another feature of the present application provides wherein the working fluid is contained in a closed circuit, and wherein the fluid expander includes a rotatable output shaft that rotates in response to the extraction of work from the working fluid.

Still another feature of the present application provides wherein the clutch is an overrunning clutch, and wherein the rotatable output shaft is in power communication with the overrunning clutch.

Yet still another feature of the present application provides wherein the overrunning clutch selectively rotates a gear when the fluid expander produces additive work to work from the electric motor, the gear in intermeshed engagement with a complementary gear that rotates with rotation of the compressor.

Still yet another feature of the present application provides wherein the fluid expander receives working fluid from one of an air motor, air starter, steam cycle system, and organic rankine cycle system.

A further feature of the present application provides wherein the fluid expander includes a rotatable output shaft that rotates in response to the extraction of work from the working fluid, wherein the clutch is an overrunning clutch, and wherein the overrunning clutch selectively rotates a gear in rotative mechanical communication with the compressor.

A still further feature of the present application further includes an adapter having an adapter housing, the fluid expander and the overrunning clutch located within the adapter.

Yet still another aspect of the present application provides a method comprising: powering an electric motor to provide a motor shaft output power to drive a fluid compressor, the fluid compressor structured to provide compression to a first fluid, flowing a second fluid to a fluid work extractor where energy in the second fluid is converted to shaft power output, and selectively engaging a fluid work extractor clutch such that the shaft power output from the fluid work extractor is added to the motor shaft output power of the electric motor.

A feature of the present application includes selectively disengaging the fluid work extractor when the electric motor produces an amount of power to backdrive the fluid work extractor in the absence of the fluid work extractor clutch.

Another feature of the present application further includes rotating a pinion located within an adapter housing during the flowing of the second fluid to the fluid work extractor.

Still another feature of the present application includes routing power from the pinion and through the fluid work extractor clutch during the selectively engaging to a driven gear associated with a shaft mechanically coupled to the fluid compressor.

Still yet another feature of the present application further includes operating a waste heat recovery system having the fluid work extractor, wherein the second fluid is a waste heat system fluid, and which further includes circulating the waste heat system fluid in a closed loop of the waste heat recovery system.

Yet still another feature of the present application provides wherein the shaft is a fluid compressor shaft separate from a motor shaft of the electric motor.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. An apparatus comprising:
   a prime mover having a rotatable output structured to provide a rotative mechanical power output;
   a fluid pump in power communication with the prime mover through the rotative mechanical power output and having an inlet for the receipt of a fluid and an outlet for the conveyance of a fluid, the fluid pump in thermal communication with a waste heat system working fluid such that waste heat generated by the fluid pump during operation is used to provide heat to the waste heat system working fluid;
   a waste heat system power provider structured to receive and extract work from the waste heat system working fluid, the waste heat system working fluid being a different composition from the fluid received in the fluid pump; and
   an adapter having an adapter housing located between the prime mover and the fluid pump, the adapter having a mechanical summer structured to add the work extracted by the waste heat system power provider to the rotative mechanical power output provided by the prime mover such that total work required to drive the fluid pump is provided by both the prime mover and the waste heat system power provider.

2. The apparatus of claim 1, wherein the fluid pump is a compressor and the fluid is air.

3. The apparatus of claim 2, which further includes a clutch mechanically coupled to the waste heat system power provider, the clutch structured to selectively mechanically connect the waste heat system power provider to the fluid pump.

4. The apparatus of claim 3, wherein the waste heat system power provider is a turbine structured to provide power to the fluid pump, and wherein the waste heat system working fluid and the working fluid are separate fluids.

5. The apparatus of claim 4, wherein the turbine is located within the adapter housing, wherein the waste heat system fluid is in a closed circuit.

6. The apparatus of claim 4, wherein the separate fluids are different compositions, and wherein the clutch is an overrun clutch.

7. The apparatus of claim 2, wherein the waste heat system fluid circulates in a closed circuit which includes components structured to change the phase of the waste heat system fluid from liquid to gas, and wherein the clutch includes components that permits the waste heat system power provider to be decoupled from the fluid pump if insufficient work is produced.

8. The apparatus of claim 2, wherein the clutch is located within the adapter housing.

9. An apparatus comprising:
   a compressor having structural members arranged to provide compression of a compressible gas;
   an electric motor having an output shaft mechanically connected to and in working communication with the compressor, the electric motor structured to provide work to the output shaft useful to the compressor for the compression of the compressible gas;
   a fluid expander structured to extract mechanical work from a working fluid separate from the compressible gas and heated by operation of the compressor which is received by the fluid expander at a first pressure and subsequently discharged from the fluid expander at a second pressure as a result of extracting work from the working fluid; and
   a mechanical power coupler having a clutch structured to selectively add work from the fluid expander to work provided through the output shaft of the electric motor such that total power delivered to the compressor originates from both the electric motor and the fluid expander when the clutch selectively adds work from the fluid expander.

10. The apparatus of claim 9, wherein the fluid expander is one of a turbine, rotary screw expander, a scroll expander, and a sliding vane expander.

11. The apparatus of claim 10, wherein the working fluid is contained in a closed circuit, and wherein the fluid expander includes a rotatable output shaft that rotates in response to the extraction of work from the working fluid.

12. The apparatus of claim 11, wherein the clutch is an overrunning clutch, and wherein the rotatable output shaft is in power communication with the overrunning clutch.

13. The apparatus of claim 12, wherein the overrunning clutch selectively rotates a gear when the fluid expander produces additive work to work from the electric motor, the gear in intermeshed engagement with a complementary gear that rotates with rotation of the compressor.

14. The apparatus of claim 9, wherein the fluid expander receives working fluid from one of an air motor, air starter, steam cycle system, and organic rankine cycle system.

15. The apparatus of claim 14, wherein the fluid expander includes a rotatable output shaft that rotates in response to the extraction of work from the working fluid, wherein the clutch is an overrunning clutch, and wherein the overrunning clutch selectively rotates a gear in rotative mechanical communication with the compressor.

16. The apparatus of claim 15, which further includes an adapter having an adapter housing, the fluid expander and the overrunning clutch located within the adapter.

17. A method comprising:
powering an electric motor to provide a motor shaft output power to drive a fluid compressor, the fluid compressor structured to provide compression to a first fluid;
heating a second fluid with a heat generated by a heat of compression of the fluid compressor;
flowing the second fluid after it has been heated with the heat of compression to a fluid work extractor where energy in the second fluid is converted to shaft power output; and
selectively engaging a fluid work extractor clutch such that the shaft power output from the fluid work extractor is added to the motor shaft output power of the electric motor.

18. The method of claim 17, which further includes selectively disengaging the fluid work extractor when the electric motor produces an amount of power to backdrive the fluid work extractor in the absence of the fluid work extractor clutch.

19. The method of claim 17, which further includes rotating a pinion located within an adapter housing during the flowing of the second fluid to the fluid work extractor.

20. The method of claim 19, which further includes routing power from the pinion and through the fluid work extractor clutch during the selectively engaging to a driven gear associated with a shaft mechanically coupled to the fluid compressor.

21. The method of claim 20, which further includes operating a waste heat recovery system having the fluid work extractor, wherein the second fluid is a waste heat system fluid, and which further includes circulating the waste heat system fluid in a closed loop of the waste heat recovery system.

22. The method of claim 20, wherein the shaft is a fluid compressor shaft separate from a motor shaft of the electric motor.

* * * * *